Oct. 20, 1959  J. F. JONES  2,908,948
CLOSURE SEALING MECHANISM
Filed Jan. 3, 1958

INVENTOR.
JAMES F. JONES
BY
Andrus, Sceales & Starke
Attorneys

United States Patent Office 2,908,948
Patented Oct. 20, 1959

2,908,948
CLOSURE SEALING MECHANISM

James F. Jones, Milwaukee, Wis., assignor to A. O. Smith Corporation, Milwaukee, Wis., a corporation of New York Application January 3, 1958, Serial No. 706,961

8 Claims. (Cl. 20—16)

This invention relates to an apparatus for sealing a joint between a closure and its associated member and particularly between an automomobile door and the body structure.

It has long been the practice to provide rubber strips or bumpers between an automobile door and its associated door frame or other body structure, which are adapted to be compressed when the door is moved to the fully closed position. While the rubber strip tends to provide a substantially air-tight seal as well as to prevent rattling of the door, use of the rubber strip is sometimes objectionable in that it is difficult to move the door to the fully closed position as the rubber strip tends to resist such movement.

With the recent trend to provide automobiles with air conditioning equipment and design trends indicating that door openings may extend up into the roof area in the future, the need for a non-obstructing seal has become increasingly important. To obtain such a seal, it has been proposed to provide either the door or the frame with a tubular inflatable seal adapted to be collapsed when the door is in the open position and expanded after the door is moved to the closed position. To this end, the tubular seal is connected to a source of compressed air by a conduit provided with a valve which controls the flow of air to the seal. When the door is moved to the fully closed position, the valve is actuated allowing compressed air to enter the seal and expand the same to form an air-tight joint between the door and the door frame. When the door is opened, an exhaust valve is actuated to allow the compressed air within the tube to escape to the atmosphere thereby deflating the tube and allowing the door to be closed without hinderance.

The present invention is directed to a collapsible and expandable tubular seal for forming a substantially air-tight joint, but eliminates the need for a supply of compressed air to expand the seal. According to the invention, either the door or the door frame is provided with a cylinder having a piston slidably mounted therein. When the door is moved to the open position, the piston is caused to slide within the cylinder thereby creating a partial vacuum within a portion of the cylinder. The partially evacuated portion of the cylinder is connected to the tubular seal by means of a suction line to draw air from the seal to the cylinder, thereby placing the seal in a partially collapsed condition. When the door is moved to the fully closed position, a valve is actuated to allow air from the atmosphere to enter the seal and expand the same to form an air-tight seal between the door and its associated door frame.

It is an object of this invention to provide a substantially air-tight joint between a door and its associated member by use of an apparatus which is relatively simple in construction, economical of manufacture and is durable and efficient in operation.

Further objects of the apparatus will appear in the course of the following description.

The drawing illustrates the best mode presently contemplated of carrying out the invention.

Figure 2:
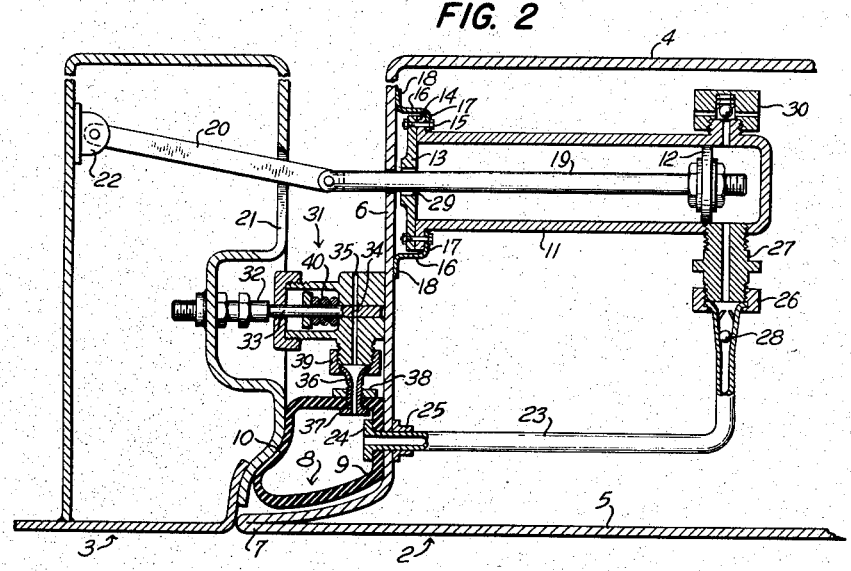
Fig. 2 is a fragmentary enlarged section taken along line 2—2 of Figure 1 showing a door of the automobile in the closed position.
Figure 1:
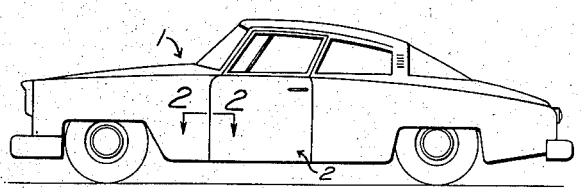
Figure 1 is a side elevation of a vehicle embodying the apparatus of this invention.
Figure 3:
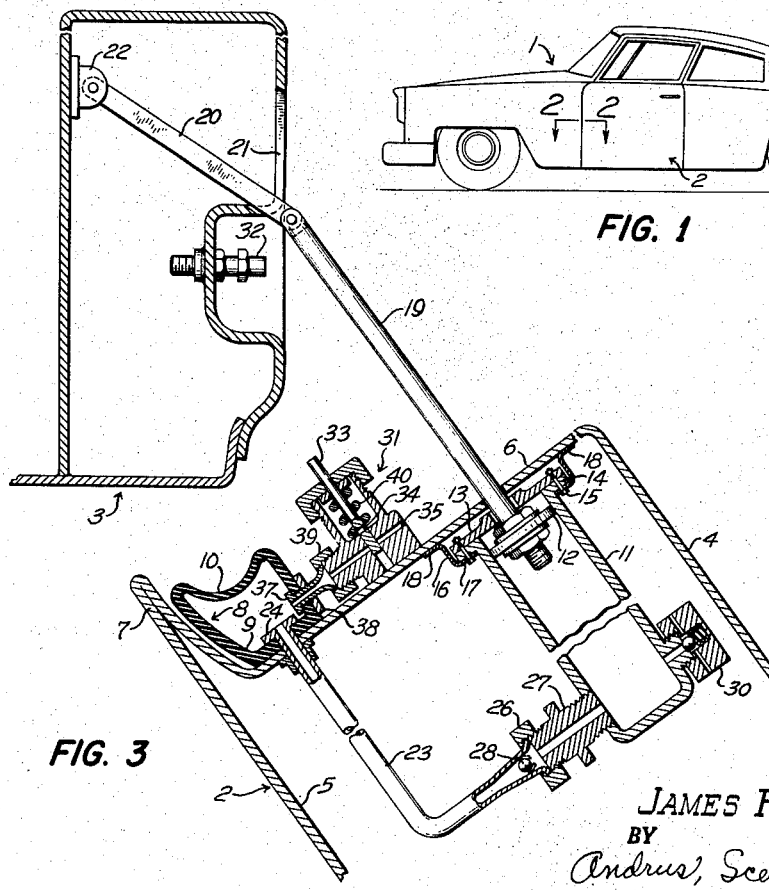
Fig. 3 is a view similar to Fig. 2 but with the door in the opened position.

In the drawing, the vehicle 1 is provided with the door 2 hinged to the door frame 3 in the customary manner and comprising a frame having an inner panel 4, an outer panel 5 and a pair of end panels 6, one of which is shown. The outer panel 5 is provided with a flange 7 extending around the periphery of door 2 and which is adapted to overlie and partially conceal a portion of the associated door frame 3 when the door is in a closed position.

A continuous inflatable, tubular seal 8 is secured to the periphery of door 2 inwardly of flange 7 and, with the seal expanded and the door fully closed, seal 8 forms an air-tight joint between door 2 and door frame 3. As shown in Fig. 2, door frame 3 engages and deforms the seal when the door 2 is closed to insure positive sealing contact between the seal and the frame. Seal 8 is composed of rubber or a like material and is cemented or otherwise secured to the door periphery with suitable bonding materials. The seal is provided with a relatively thick inner portion 9, relative to end panel 6, and a thin outer portion 10 which is adapted to be collapsed and expanded under the influence of air pressure.

A mechanism for varying the air pressure within seal 8 is carried by door 2 and the door frame 3 and, in general, functions to partially collapse seal 8 when door 2 is moved to the open position and expand seal 8 when door 2 is moved to the fully closed position. The mechanism includes a cylinder 11, having a piston 12 slidably mounted therein and which is disposed within door 2 between door panels 4 and 5. The open end of cylinder 11 is enclosed by a head 13 which is provided with suitable openings to register with similar openings in the peripheral flange 14 of the cylinder. These registering openings receive the bolts 15. The cylinder 11 is secured within the door by means of a pair of brackets 16 having inwardly extending flanges 17 and outwardly extending flanges 18 which are welded to end panel 6. The flanges 17 are provided with suitable openings through which bolts 15 are extended. The bolts are provided with suitable nuts which serve to hold cylinder 11 to cylinder head 13 and to brackets 16.

The piston 12 is actuated within cylinder 11 by means of the piston rod 19 extending through aligned openings in cylinder head 13 and end panel 6 and pivotally attached to a link strap 20. The link strap 20 extends through an elongated slot 21 in door frame 3 and is pivotally connected to the bracket 22 which is attached to the door frame 3 opposite slot 21.

In operation, when door 2 is moved to the open position, piston rod 19 pivots relative to link strap 20 in a clockwise direction, as seen in Fig. 2, and link strap 20 pivots in a like direction relative to bracket 22 to maintain the piston and cylinder in alignment and allow the piston to slide within the same. As door 2 is moved to the closed position, link strap 20 and piston rod 19 move in the reverse manner of that just described to insure piston and cylinder alignment.

When door 2 is opened, piston 12 moves toward head 13 creating a vacuum in cylinder 11 rearwardly of piston 12, in direction of piston travel, which acts through a conduit 23, communicating with the evacuated portion of cylinder 11 and the interior of seal 8 to withdraw air from within the seal to place the seal in a partially collapsed condition. One end of conduit 23 terminates in an enlarged head 24 which passes through and overlaps a portion of the tubular seal 8 and which is secured to door end panel 6 by a nipple 25. The other end of conduit 23 flares outwardly and carries a collar 26 which is threadedly secured to a coupling 27 disposed in a suitable opening in the wall of cylinder 11. A check valve 28 is disposed in the flared end of conduit 23 and prevents flow of air from cylinder 11 to tubular seal 8, thereby maintaining the seal in a partially collapsed condition as long as door 2 is in the open position and insuring that door 2 may be closed without obstruction from the seal. The air in cylinder 11 which is compressed by the movement of piston 12 towards head 13 escapes through a clearance 29 which is provided between cylinder head 13 and piston rod 19 to permit unopposed movement of piston 12 towards head 13.

When door 2 is moved to the closed position, piston 12 is caused to move away from cylinder head 13 compressing the air in cylinder 11 forwardly of piston 12 in direction of piston travel. This compressed air is discharged from cylinder 11 through a pressure relief valve 30 disposed in a suitable opening at the outer end of cylinder 11. The relief valve 30 is set to initially open preferably at a pressure corresponding to the pressure created in the cylinder 11 by a relatively small amount of displacement of piston 12 away from head 13. With such a setting on the relief valve, door 2 may be closed with comparative ease as movement of the piston is not opposed by a substantial pressure buildup as would be the case if relief valve 30 were set to open at a substantially higher pressure.

An air intake valve 31 is secured to end panel 6 adjacent seal 8 and, when actuated, permits expansion of the collapsed seal. With the door 2 closed and the seal 8 in a partially collapsed condition, a stop 32, associated with an indented portion of door frame 3, actuates valve 31 to admit air from the atmosphere to the seal. To this end, the valve 31 is provided with a valve stem 33 which is slidably mounted centrally of the valve and is provided with a transverse port 34 intermediate its length. When stem 33 is depressed by stop 32, port 34 registers with a passage 35 extending the width of valve 31 to establish communication between the atmosphere and the tubular seal 8 through a tubular member 36. Tubular member 36 is provided with an enlarged head 37 which extends through and overlaps a portion of seal 8 and which is secured thereto by means of lock nut 38. The opposite end of member 36 is connected to valve 31 by means of collar 39. With the arrangement of parts as described, and with door 2 closed, air from the atmosphere will enter the seal through passage 35, port 34 and member 36 until the pressure therein equals that of the atmosphere causing the seal to expand to form an air-tight joint between door 2 and frame 3. Communication between the atmosphere and seal 8 is prevented when door 2 is opened by a spring 40 which functions to bias stem 33 outwardly and move port 34 out of registry with passage 35 when stop 32 does not prevent such movement.

While the seal 8 has been shown here as attached to the periphery of door 2 and the cylinder and piston within door 2, the apparatus would work equally well if the seal and the cylinder and piston were associated with the door frame.

Furthermore, while the apparatus has been shown here as installed in an automobile and the operation described as related thereto, the apparatus may be used with equal effectiveness on any structure where it is desired to form an air-tight joint between a door or a closure of any type and its associated member. Refrigerators, freezers, gas-tight shelters and sandblast rooms are a few examples of structures where the door sealing apparatus of this application might be useful.

The novel construction of this apparatus permits a substantially air-tight joint to be formed between the door and its associated frame structure without the necessity of a supply of compressed air as heretofore required in the art with this type of seal. Because of this, the present apparatus is very simple in construction, relatively inexpensive to manufacture and requires comparatively little maintenance in operation. Furthermore, the apparatus is carried completely by the door and the door frame and is separate and independent in operation from the units associated with the other doors. Thus, breakdown of one sealing apparatus will not adversely affect operation of the remaining units.

Various modes of carrying out the invention are contemplated as being within the scope of the following claims particularly pointing out and distinctly claiming the subject matter which is regarded as the invention.

I claim:

1. In combination with a closure member and an associated member defining a closure opening, a hollow inflatable and deflatable sealing element interposed between the closure member and its associated member, said element in its inflated condition containing fluid at atmospheric pressure, means actuated by the opening of the closure for withdrawing fluid from said element to cause the same to deflate, and means actuated by the substantially complete closing of said closure for introducing fluid from the atmosphere into the deflated sealing element to cause the same to inflate and provide an air-tight seal between said members.

2. In combination with a door member and an associated member defining a door opening, a tubular element carried by one of said members and being expansible and collapsible under the influence of fluid pressure, means actuated by opening the door for decreasing the fluid pressure within said element below that of atmospheric pressure thereby placing the same in a collapsed condition, and means actuated by closing the door for providing communication between said element and the atmosphere to permit flow of fluid pressure from the atmosphere to said element and thereby expand the same to form a seal between said members.

3. In an apparatus for forming a seal between a door member and an associated member defining a door opening, a resilient tubular seal containing a compressible fluid and adapted to be carried by one of said members, said seal adapted to be interposed between said members when the door member is in the closed position, means adapted to be carried by one of said members for applying a partial vacuum to said tubular seal when said door is opened to thereby withdraw fluid from said tubular seal and place the seal in a collapsed condition, and means adapted to be carried by one of said members for introducing fluid from the atmosphere into said seal when the door is in the closed position thereby causing the seal to expand to form an air-tight joint between said members.

4. In a door structure, a door frame member, a door member hinged to said door frame member and adapted to be opened and closed, a tubular element extending around the joint between said members when the door member is in the closed position, said tubular element being expansible and collapsible under the influence of fluid pressure, means carried by one of said members for decreasing the fluid pressure within said element below that of atmospheric pressure when said door member is opened, said element being placed in a collapsed condition by said decrease of fluid pressure, and means carried by one of said members for providing communication between said element and the atmosphere when said door member is in the substantially closed position, said element being expanded to form an air-tight joint between said members by flow of fluid from the atmosphere to said element.

5. In combination with a door member and an associated member defining a door opening, an inflatable and deflatable tubular element secured to one of said members and extending around the outer portion thereof, a cylinder connected to one of said members, piston means slidable within said cylinder and connected to the other of said members whereby the piston is caused to slide within said cylinder as the door member is moved to the open position to evacuate an end portion of the cylinder, conduit means providing communication between said end portion and said tubular element for permitting flow of air from said element to said end portion to thereby deflate said element, check valve means disposed in said conduit means to restrict flow of air from said end portion to said element, pressure relief means connected to said end portion of said cylinder for relieving the pressure of the compressed air from said end portion as the door member is moved to a closed position, valve means associated with said element for admitting atmospheric air into the tubular element, and means for actuating said valve means on a substantially full closing of said door member thereby causing said tubular element to inflate to form a seal between said members.

6. In a closure structure, a frame member defining an opening, a closure member connected to said frame member and adapted to close said opening, a resilient seal containing a compressible fluid and connected to one of said members, a cylinder carried by one of said members, piston means slidable within said cylinder, means for pivotally connecting said piston means to the other of said members to permit movement of the piston within said cylinder as the closure member is moved towards the open position, said movement of the piston causing an end portion of said cylinder to be evacuated, conduit means providing communication between said seal and said end portion of said cylinder for conducting fluid within said seal to said end portion of the cylinder to thereby place said seal in a deflated condition, check valve means disposed in said conduit means for preventing flow of fluid from said cylinder to said seal to thereby maintain said seal in a deflated condition as said closure member is moved to the closed position, pressure relief means associated with said end portion of the cylinder to relieve the pressure of the compressed fluid in said end portion of the cylinder as the closure member is moved to the fully closed position, valve means associated with said seal for admitting atmospheric air into said seal, and means for actuating said valve means when said closure member is moved to the fully closed position to allow admission of said air into said seal to expand the same into sealing engagement with said members.

7. In a door structure, a door frame member defining an opening, a door member hinged to said door frame member and adapted to close said opening, a deformable hollow element mounted on one of said members and extending around the outer portion thereof; a cylinder connected to one of said members and having piston means slidably mounted therein; means for pivotally connecting said piston means to the other of said members to allow movement of said piston means relative to said cylinder when the door member is moved relative to its associated member, the movement of said door member to the open position resulting in said piston sliding relative to said cylinder to effect a vacuum within an end portion of said cylinder; conduit means communicating with said element and the end portion of said cylinder to permit passage of air from within said element to said end portion of said cylinder as the door member is opened to thereby deform said element; check valve means disposed in said conduit means preventing the flow of air from the cylinder to said element and for maintaining said element in a deformed condition as said door member is moved to the fully closed position; pressure relief means associated with said end portion of said cylinder to relieve the pressure of the air compressed therein as the door member is moved to the closed position; valve means associated with said element and including a passage providing communication between the atmosphere and said element, a slidable valve stem having an opening therein to register with said passage, a spring disposed to normally bias said opening in said valve stem out of registry with said passage; and a stop member adapted to depress said valve stem when said door member is moved to the fully closed position to cause registry of said opening and said passage whereupon air from the atmosphere flows into said element and expands the same into sealing engagement with said members.

8. In a door structure, a door frame member defining an opening, a door member hinged to said door frame member and adapted to be opened and closed, a tubular sealing element carried by the periphery of said door member and adapted to form a seal between said members when the door member is closed, a cylinder mounted in said door member, piston means slidably mounted within said cylinder and pivotally connected to said door frame member to allow movement of said piston within said cylinder as the door member is opened and closed, said movement of the piston within the cylinder causing an end portion of the same to be evacuated, conduit means providing communication with said element and the end portion of the cylinder evacuated when the door member is opened to allow air within said element to be drawn into said end portion thereby placing the sealing element in a compressed condition, check valve means disposed in said conduit means to restrict flow of air from said end portion to said sealing element, pressure relief means disposed in said end portion of said cylinder for relieving the pressure of the compressed air from said end portion as the door member is closed, valve means associated with said sealing element and adapted to provide communication between the same and the atmosphere, and means to actuate said valve means when the door member is closed to permit flow of air from the atmosphere to said sealing element thereby expanding the same to form a seal between said members.

References Cited in the file of this patent

UNITED STATES PATENTS

| | | |
|---|---|---|
| 2,104,144 | Zand | Jan. 4, 1938 |
| 2,757,225 | Dunn | July 31, 1956 |